United States Patent [19]

Carraway, Jr.

[11] Patent Number: 5,452,918
[45] Date of Patent: Sep. 26, 1995

[54] AUTOMATIC MOTORIZED LAP BELT FOR VEHICLES

[76] Inventor: Bruce H. Carraway, Jr., 3209 Henderson Walk, Atlanta, Ga. 30340

[21] Appl. No.: 222,104

[22] Filed: Apr. 1, 1994

Related U.S. Application Data

[63] Continuation-in-part of Ser. No. 197,955, Feb. 17, 1994, abandoned, which is a continuation-in-part of Ser. No. 42,587, Apr. 4, 1993, abandoned.

[51] Int. Cl.⁶ .................................................. B60R 22/06
[52] U.S. Cl. ........................ 280/804; 280/808; 297/469; 297/473
[58] Field of Search ............... 280/801.1, 801.2, 280/804, 808; 297/469, 473; 244/122 R, 122 B

[56] References Cited

U.S. PATENT DOCUMENTS

| | | | |
|---|---|---|---|
| 3,799,577 | 3/1974 | Colucci | 280/802 |
| 3,830,518 | 8/1974 | Silber | |
| 3,833,239 | 9/1974 | Coenen | 280/804 |
| 4,070,040 | 1/1978 | Igeta | |
| 4,313,622 | 2/1982 | Suzuki et al. | |
| 4,392,671 | 7/1983 | Fohl | |
| 4,548,425 | 10/1985 | Evans | 280/808 |
| 4,561,677 | 12/1985 | Kawai | 280/807 |
| 5,044,664 | 9/1991 | Mogi | |
| 5,183,291 | 2/1993 | Shah | |

FOREIGN PATENT DOCUMENTS

| | | | |
|---|---|---|---|
| 2738439 | 3/1979 | Germany | 280/801.1 |

*Primary Examiner*—Eric D. Culbreth
*Attorney, Agent, or Firm*—James A. Hinkle

[57] ABSTRACT

Motorized bi-level safety belts having a lap belt and a shoulder belt with a base end of each anchored to a separate retractor at an inside portion of a vehicle seat. Moveable ends of the lap belt and shoulder belt are attachable to a moveable base that is separable into a shoulder level and a seat level. The moveable base travels in a rail from a body-release mode in a position at a front of a vehicle door to a body-restraint mode in which the moveable base is separable into a shoulder level and a seat level at the back of the door. The rail is attached to a frame of the door. Curved accurately shaped, rigid areas of the belts are provided to prevent contact of a lap belt and a shoulder belt with a body of an individual on a vehicle seat and to prevent contact of the safety belts with a steering wheel of a car in transit between body-release and body-restraint modes. Wide, flexibly rigid, soft-edged and selectively arcuate sections of the belts are optionally attached to or attachable to portions of the safety belts. The curved arcuately shaped, rigid areas of the belts which are immediately near the rail and anchor end are curved and pointed toward the front of the vehicle while in the rest position. Passenger-side features are mirror images of drive-side features except for optional rigid areas of the belts related to avoiding contact of the lap belt and shoulder belt with a steering wheel on the driver's side, however, the curved accurately shaped, rigid areas of the belts may still be desired to prevent contact of the belts with the occupant of either seat.

5 Claims, 6 Drawing Sheets

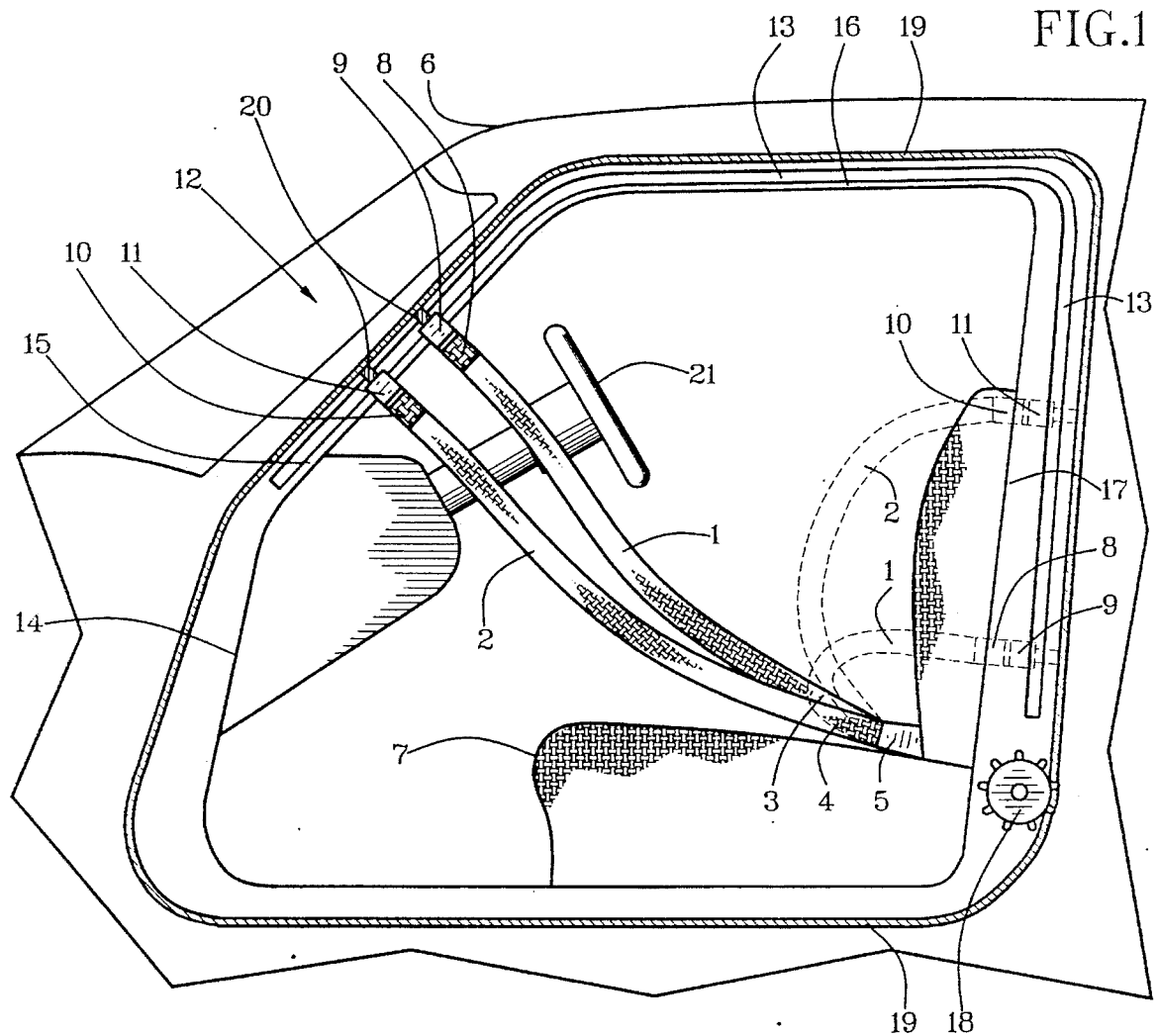
FIG.1
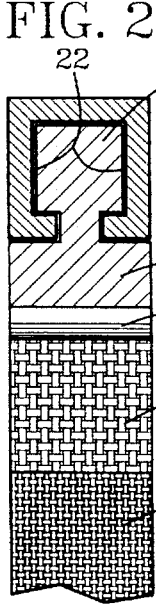
FIG. 2
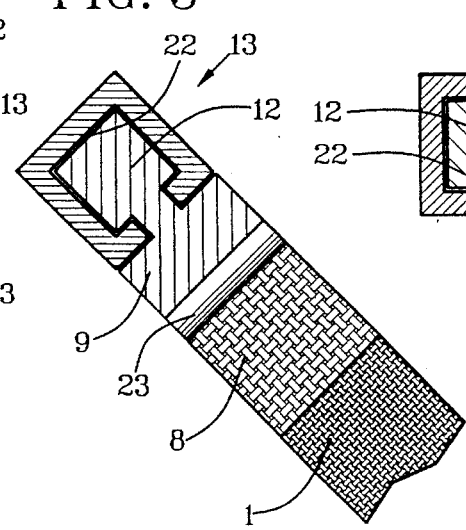
FIG. 3
FIG. 4

FIG. 5 FIG. 6
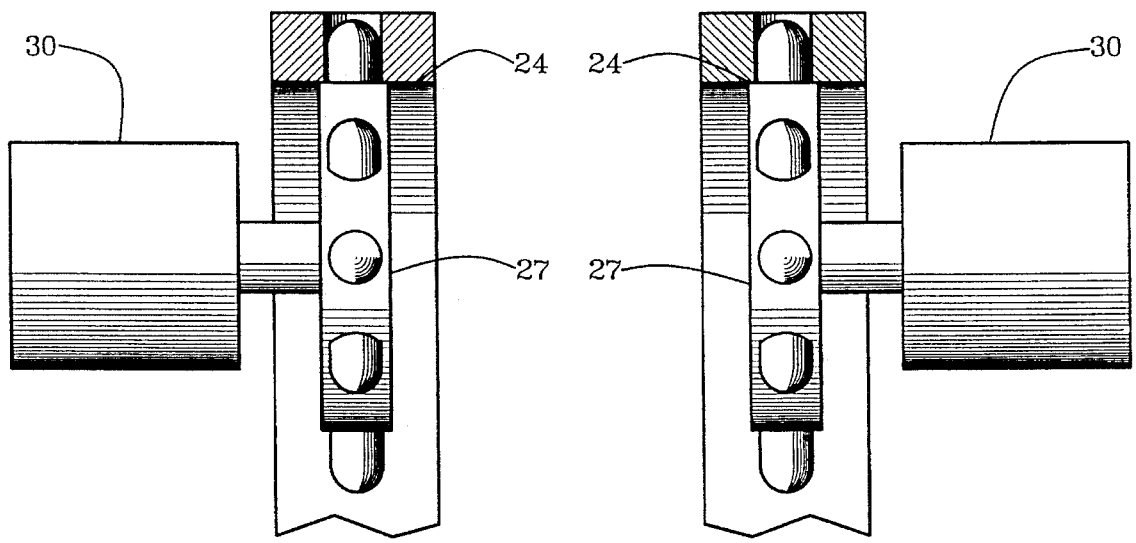
FIG. 7 FIG. 8
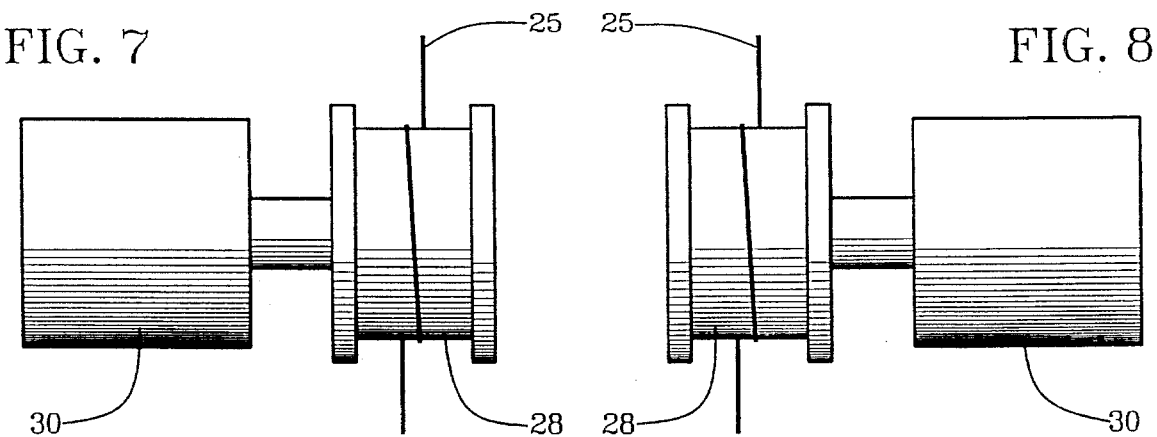
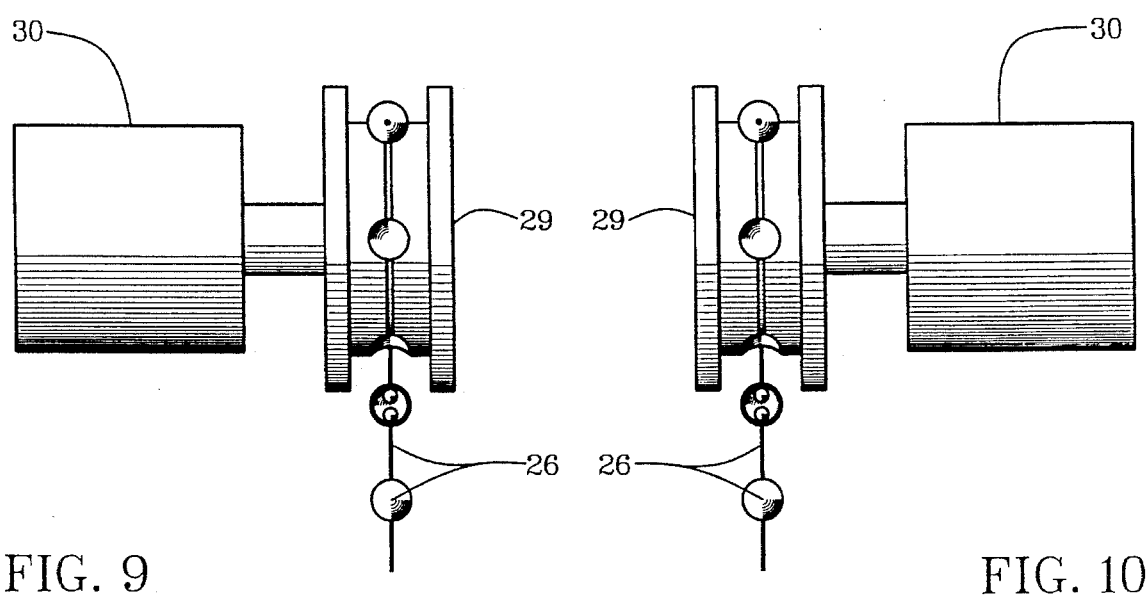
FIG. 9 FIG. 10

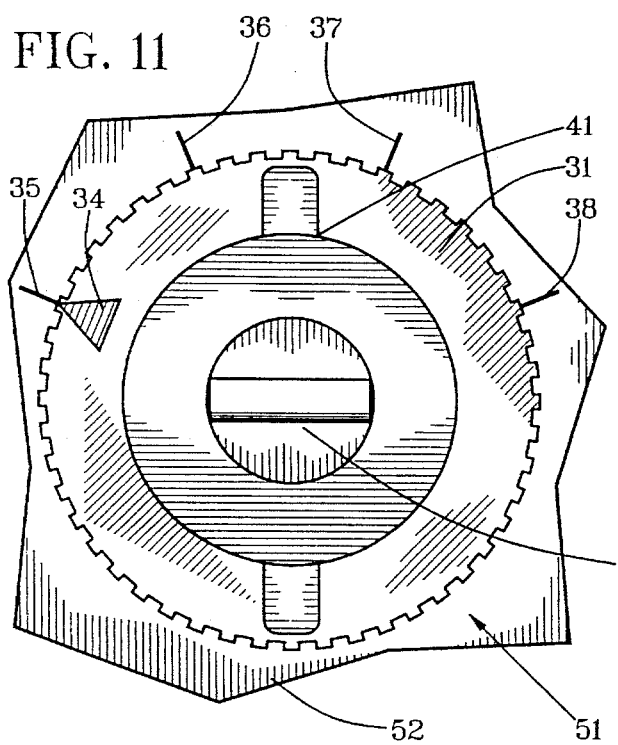
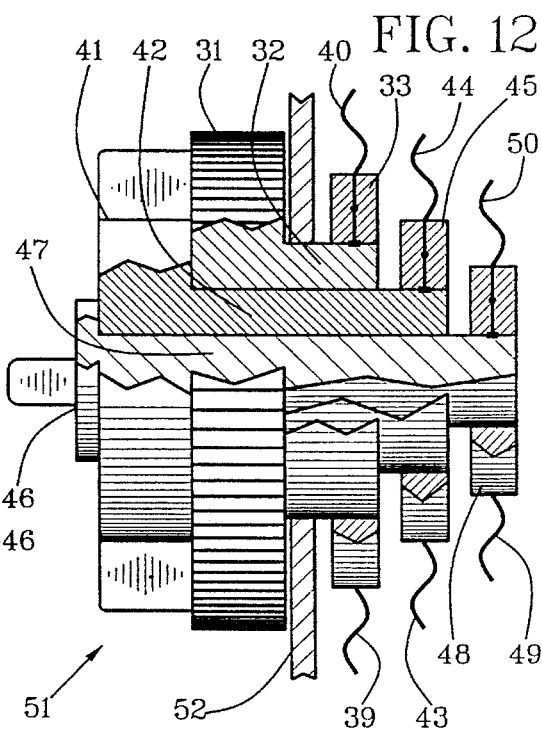
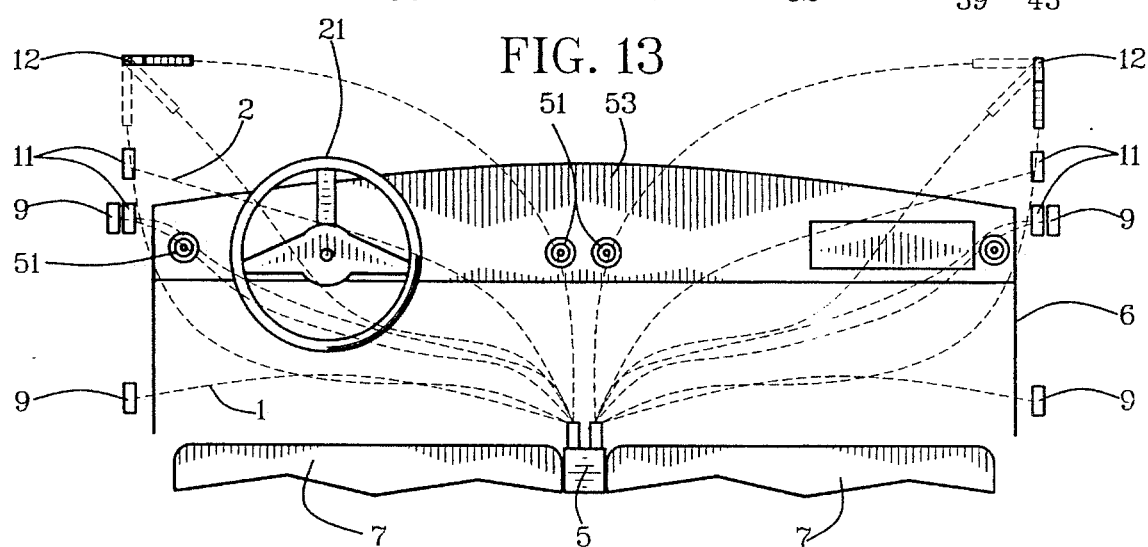
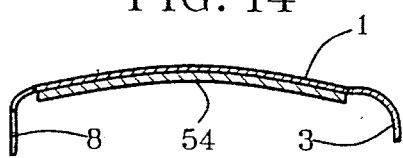
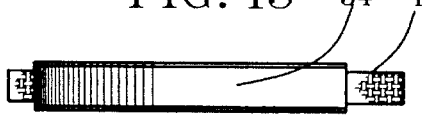

FIG. 20
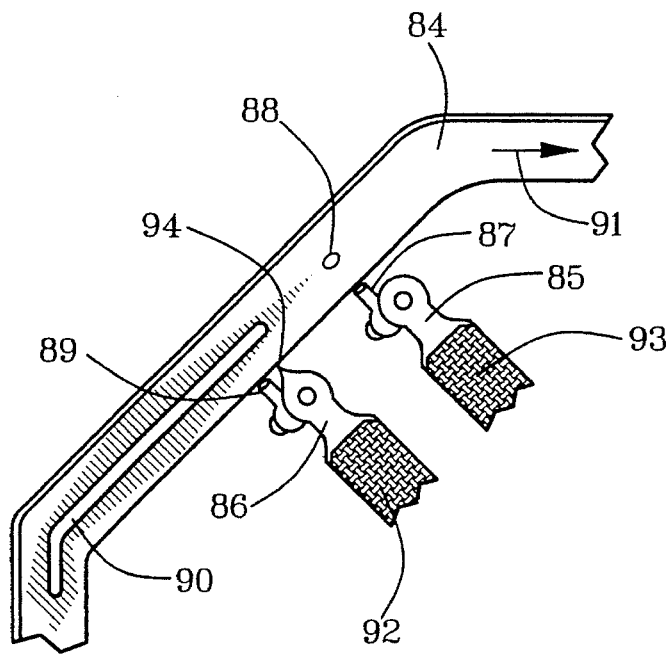
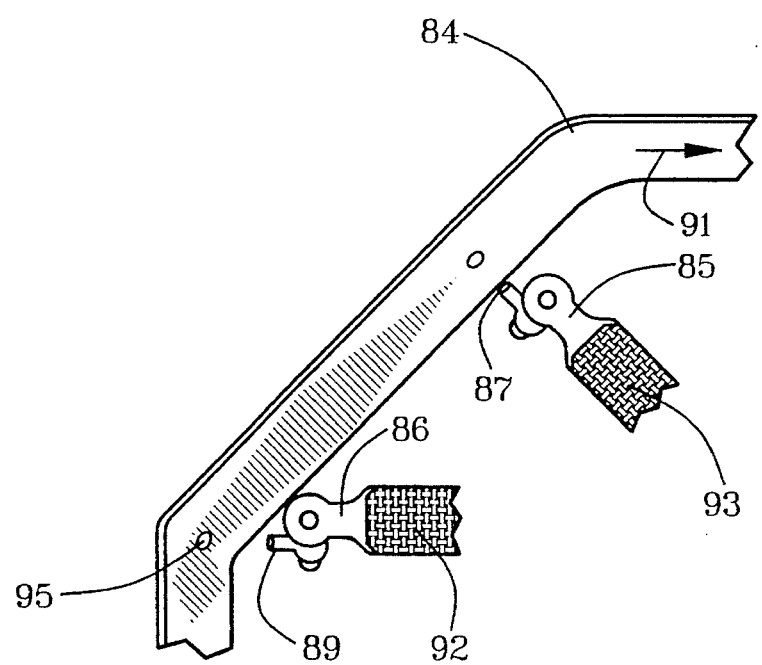
FIG. 21

AUTOMATIC MOTORIZED LAP BELT FOR VEHICLES

RELATED PATENT DOCUMENTS

This is a Continuation-In-Part of U.S. utility patent application Ser. No. 08/107,955, filed Feb. 17, 1994, by Bruce H. Carraway, Jr., which was a Continuation-In-Part of U.S. utility patent application Ser. No. 08/042,587 filed Apr. 4, 1993, by Bruce H. Carraway, Jr., both abandoned.

BACKGROUND OF THE INVENTION

I. Field of the Invention

The present invention relates generally to the field of vehicle safety belts. In particular, it relates to motorized bi-level restraint at both a lap and a shoulder level of a person on a seat in a vehicle.

II. Description of the Prior Art

Automatic shoulder belts for passive safety restraint in vehicles are produced and used quite commonly. Automatic seat belts, however, are known but have not been produced as widely as the shoulder-restraining safety belts. Even though seat belts protect more of a person's body and have been designed for automatic use with automatic shoulder belts, popularity of automatic seat belts and demand for them has declined since the advent of passive restraints. Shoulder restraint alone decreases injuries from head contact with a windshield or steering wheel. However, it does not prevent injuries from lower-body contact with front portions of a vehicle. Midsections, spines, knees and most other parts of the body are left unprotected with only a shoulder belt.

Safety belts that restrain both shoulder and lap sections of a person in a vehicle are referred to as bi-level safety belts. Those that operate automatically together are known as automatic bi-level safety belts.

The concept of bi-level safety belts automatically going into a protective position when people drive and ride in cars caught attention of the public and the automobile industry alike at first. Then it died down to where only motorized shoulder belts were produced and they became a detriment to sales of cars that had them. Instead of producing known automatic bi-level safety belts, vehicle manufacturers generally have chosen to produce motorized shoulder belts separately in combination with manually operated lap belts. In the past several years, demand for motorized shoulder belts in combination with manual lap belts also has declined. Automobiles having them are hard to sell. Car manufacturers are terminating production of motorized shoulder belts, or at most providing motorized shoulder belts for only inexpensive models and some low-price cars.

People tend to use a manual lap belt even less when they have a motorized shoulder belt than when they don't have a motorized shoulder belt. They are motivated more by convenience, use of mental energy and time until they start driving. Then they think more of safety. This is not necessarily a fault, but a nature of people. According to a recent study by the National Highway Traffic Safety Administration, the current usage of manual lap belts and manual shoulder belts is about sixty percent (60%), whereas the usage of motorized shoulder belts exceeds ninety-one percent (91%).

In light of this human characteristic, a safety solution is a responsibility of producers of automobiles, not of people to function contrary to their inherent or acquired tendencies. People want safety. But they want it with conservation of their time and concern.

Reasons for decrease in demand and resulting decrease in production of bi-level safety belts and of motorized shoulder belts alone include the following:

(1) They are in the way, obtrusive and at times injurious when people get in and out of cars;

(2) The belts pass too close to heads and torsos of individuals when the belts are en route between body-release mode and body-restraint mode;

(3) They travel so fast in mode-change transit that they startle and at times injure people;

(4) They are too automated in a set routine for allowing selective variation of automated function for different individual desires and for different use conditions;

(5) Most of the problems for motorized bi-level safety belts relate to the lap belt portions; and (6) The motorized shoulder belts alone don't provide enough protection without manual fastening of a lap belt that takes little or no more effort than fastening manual bi-level safety belts.

(7) People psychologically think they are secure in the vehicle and do not buckle lap belts.

Prior-art patents in this field include U.S. Pat. No. 3,830,518 granted Silber. Silber taught an motorized bi-level safety belt with an attachment end that traveled in a rail along a vehicle ceiling in a circular route to circumvent a body of a person on a seat in the vehicle. Then the rail went down a door post to a low seat-level position for a lap belt and to a separate higher shoulder-level position for a shoulder belt. Although its claims were broad enough to include rails positioned differently, the ceiling positioning it taught routed belts too close to an individual in order to circumvent a steering wheel. Also, it prevented use of open roofs and obstructed vision.

U.S. Pat. No. 4,070,040 granted to Igeta changed the Silber device slightly but provided substantially the same ceiling-mounted rail as taught by Silber. It had similar routing limitations although in an advanced form.

U.S. Pat. No. 4,313,622 granted to Suzuki et al teaches a thick belt for holding an attachment end of an motorized shoulder belt. The belt traveled in a rail from a front door post to a rear door post and then part way down the rear door post to a shoulder level. It did not provide for a lap belt with a second attachment end to travel to a seat level. The Suzuki device is used commonly because it omitted problems of an automated lap belt portion by omitting the lap belt itself. The Suzuki form of passive restraint in particular has deterred sales of cars with passive restraints for the reasons enumerated above. However, like some of the other forms of bi-level passive restraint, it has some features which can be utilized effectively as taught by this invention.

U.S. Pat. No. 4,392,671 granted to Föhl further advances the Suzuki device with elimination of the lap belt. It also teaches a combined door-mounted restraint that has not found popular acceptance and is not relative to this invention.

U.S. Pat. No. 5,183,291 granted to Shah describes shoulder belt track and lap belt track means that are positioned in a ceiling like the Silber patent in one embodiment. In other embodiments it is positioned variously around complete doorways of vehicles in an operational relationship similar to the Suzuki and Föhl devices. Such broad reference to means is employed in the Shah patent that it tends only to describe problems instead of structural solutions. The problems of the prior art remain unsolved. Some of those problems and others in addition are solved with this invention.

U.S. Pat. No. 5,044,664 granted to Mogi teaches an adjustable stop that could have been employed in combination with the Igeta device. But it was a different stop means than taught in this invention. Shah mentioned but did not describe stop means that could have been employed if taught for the Igeta device. Neither Mogi nor Shah taught the particular stops and separate positioning means employed for lap belts and shoulder belts in this invention.

Previous problems with motorized bi-level safety belts have been characteristics of the automation and of the safety belts, not automation of bi-level safety belts per se.

SUMMARY OF THE INVENTION

In accordance with the present invention, it is contemplated that in light of problems that have existed and that continue to exist with automated bi-level safety belts, objectives of this invention are to provide a motorized bi-level safety belt which:

Positions a moveable anchor of motorized bi-level safety belts out of the way for getting in and out of vehicles when the motorized bi-level safety belts are in a body-release mode;

Avoids closeness and contact of the moveable anchor with bodies of people on vehicle seats and with a steering wheel when the moveable anchor is traveling between body-release and body-restraint modes of passive restraint;

Provides adjustment of automation routine of a bi-level passive restraint for individual desires within protective limits;

Allows adjustment of speed of travel of the moveable anchor between body-release and body-restraint modes;

Positions automation controls where accessible conveniently for adjustment;

Provides non-injurious and effective shapes and forms of lap belts and shoulder belts for a bi-level passive restraint; and Provides adjustment of positioning of shoulder belts and lap belts in a body-restraint mode of a bi-level passive restraint for vehicles.

This invention accomplishes the above and other objectives with motorized hi-level safety belts comprised of a lap belt and a shoulder belt with a base end of each anchored at an inside portion of a vehicle seat. Moveable ends of the lap belt and shoulder belt are attachable to a moveable base that is separable into a shoulder level and a seat level. The moveable base travels in a rail from a body-release mode in a-position at a low front of a vehicle door to a body-restraint mode in which the moveable base is separable into a shoulder level and a seat level at a back of the front door. The rail is attached to a frame of the door. Guide means are provided to prevent contact of a lap belt and a shoulder belt with a body of an individual on a vehicle seat and to prevent contact of the safety belts with a steering wheel of a car in transit between body-release and body-restraint modes. Wide, flexibly rigid, soft-edged and selectively arcuate sections of the belts are optionally attached to, or attachable to, the lap belt anchor where the emergency disconnect button attaches to guide rail. Driver-side features are mirror images of passenger-side features except fox guide means related to avoiding contact of the lap belt and shoulder belt with a steering wheel on the driver's side.

Other objects, advantages and capabilities of the invention will become apparent from the following description taken in conjunction with the accompanying drawings showing preferred embodiments of the invention.

BRIEF DESCRIPTION OF THE DRAWINGS

FIG. 1 is a side elevation view of a doorway section, a seat and a steering wheel of a vehicle in relationship to motorized bi-level safety belts of this invention;

FIG. 2 is a side view of an end of a lap belt or shoulder belt in relationship to a rail in vertical attitude.

FIG. 3 is the FIG. 2 illustration in a slant attitude;

FIG. 4 is the FIG. 2 illustration in a horizontal attitude;

FIG. 5 is a side view of a safety-belt motor in relation to a section of cog belt and a cog wheel;

FIG. 6 is a side view of a second safety-belt motor in relation to a section of a second cog belt and cog wheel positioned for side-by-side dual operation of a lap belt and a shoulder belt;

FIG. 7 is a side view of a safety-belt motor in relation to a section of wire or wire rope and a pulley wheel;

FIG. 8 is a side view of a second safety-belt motor in relation to a section of a second wire or wire rope and pulley wheel positioned for side-by-side dual operation of a lap belt and a shoulder belt;

FIG. 9 is a side view of a safety-belt motor in relation to a section of ball chain and a ball-chain wheel;

FIG. 10 is a side view of a second safety-belt motor in relation to a section of a second ball chain and ball-chain wheel positioned for side-by-side dual operation of a lap belt and a shoulder belt;

FIG. 11 is a front view of a combination switch for control of automation features;

FIG. 12 is a cutaway side view of the FIG. 11 illustration;

FIG. 13 is a rear view of a dashboard, steering wheel and seat of a vehicle in relationship to automatic positioning of lap belts and shoulder belts;

FIG. 14 is a side view of a lap belt with an arcuate pad;

FIG. 15 is a bottom view of the FIG. 14 illustration;

FIG. 16 is a side view of a shoulder belt with an arcuate pad;

FIG. 20 is a fragmentary perspective view showing one arrangement for placing the two belts in their desired restraining position; and FIG. 21 is a view similar to FIG. 20 showing a modified arrangement.

DESCRIPTION OF THE PREFERRED EMBODIMENTS

Figure 17:
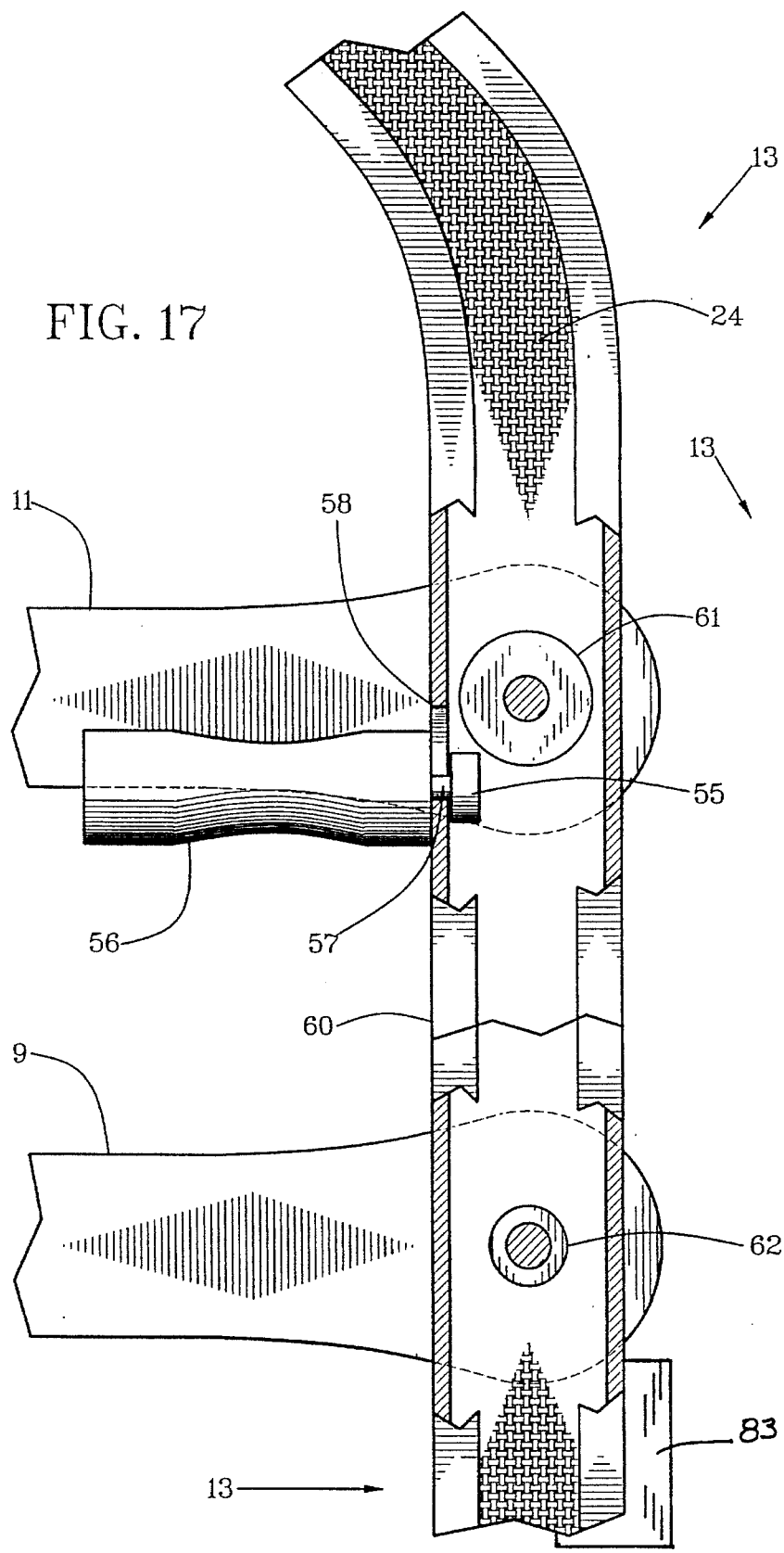
FIG. 17 is a sectional side view of a rail with a stop in relation to ends of a lap belt and shoulder belt.

Referring to the drawings wherein like reference numerals designate corresponding parts throughout the several figures, reference is made first to FIG. 1. A lap belt 1 and a shoulder belt 2 have a base end 3 of the lap belt 1 and a base end 4 of the shoulder belt 2 anchored to a stationary base 5 in a vehicle 6 at an inside portion of a seat 7 in the vehicle 6. A rigid end 8 of the lap belt 1 is attachable to a moveable lap belt anchor 9. A moveable end 10 of the shoulder belt 2 is attachable to a moveable shoulder belt anchor 11. The moveable lap belt anchor 9 and the moveable shoulder belt anchor 11 together comprise a moveable base 12 that is separable into the moveable lap belt anchor 9 and the moveable shoulder belt anchor 11.

The moveable base 12 comprising the moveable lap belt anchor 9 and the moveable shoulder belt anchor 11 is moveable on a rail 13 that is attached to a door frame 14. The rail 13 is extended from a front portion 15 of the door frame 14, continued over a top portion 16 of the door frame 14 and then extended down a rear portion 17 of the door frame 14. The moveable base 12 is moveable as propelled between a body-release mode at select positioning on the front portion 15 and a body-restraint mode at select positioning on the rear portion 17 of the door frame 14. The moveable base 12 is propelled reversibly between the body-release mode and the body-restraint mode by a motorized wheel 18 that is in traction relationship to a flexible line 19. The moveable 12 base is attached with a propulsion attachment 20 to the flexible line 19. The flexible line 19 and the rail 13 are juxtaposed along common portions of the door frame 14.

The lap belt 1 and the shoulder belt 2 are guided to circumvent a steering wheel 21 and a torso of an individual on the seat 7 when the moveable base 12 is en route between the body-release mode and the body-restraint mode. The moveable lap belt anchor 9 and the moveable shoulder belt anchor 11 are positioned in body-release mode where they will not interfere with, be dangerous to or be obnoxious to people getting in and out of the vehicle 6. In present practice, it is common for moveable anchors of lap belts and shoulder belts to be positioned where they are hit by heads or legs of people getting in and out of cars. This invention remedies the transitional and positional problems of motorized lap belts and shoulder belts.

Reference is made here to FIGS. 2–4 in addition to FIG. 1. The rail 13 can be any of a variety of rail means on which or in which a corresponding variety of moveable bases 12 can be transported reversibly by a variety of flexible lines 19 between the front portion 15 and the rear portion 17 of the door frame 14 while the particular moveable base 12 employed is being oriented in a design attitude relative to a plane of the door frame 14. The particular rail 13 illustrated, for example, has a plurality of guide surfaces 22 on an inside periphery of a rectangular rail 13 to orient a moveable belt anchor 9 or 11 in the design attitude. Only a lap belt 1 is shown in different attitudes in FIGS. 2–4 because the shoulder belt 2 can be the same or similar in this regard.

The lap belt 1, or in a similar manner the shoulder belt 2, has a relatively rigid moveable end 8 that is extended a desired distance from a connector 23 for designed orientation in relationship to guide surfaces 22. The connector 23 is pivotal primarily perpendicular to the rail 13 as depicted by an axle type of connector 23. Either belt 1 or 2 can have graduated rigidity in a direction of the connector 23. The rail 13 and the moveable base 12 in it are shown in a vertical attitude in FIG. 2, in a slanted attitude in FIG. 3 and in a horizontal attitude in FIG. 4. Functions of design attitude of the moveable base 12 and of the relative rigidity of the moveable ends 8 and 10 of the lap belt 1 and shoulder belt 2 are for direction of the respective belts away from contact with either an individual on the seat 7 or the steering wheel 21 as explained further in relation to FIG. 13.

Reference is made here to FIGS. 5–10 in addition to FIG. 1. The flexible line 19 can be either a cog belt 24 as shown in FIGS. 5–6, a wire 25 or wire rope as shown in FIGS. 7–8, a ball chain 26 as shown in FIGS. 9–10 or other type of flexible line or belt means. The motorized wheel 18 can be a cog wheel 27 as shown in FIGS. 5–6, a pulley wheel 28 as shown in FIGS. 7–6, a ball-chain pulley wheel 29 as shown in FIGS. 9–10 or other type of motorized wheel as appropriate for the particular type of flexible line 19 employed.

The rail 13 and the flexible line 19 juxtaposed parallel to it can be singular for singular construction as shown in FIGS. 5, 7 and 9 or in pairs for dual construction as shown in combined pairs of FIGS. 5–6, 7–8 and 9–10. A motor 30 can be provided for each motorized wheel 18, 27, 28 or 29. For singular construction, the moveable base 12 having a separable moveable lap belt anchor 9 and moveable shoulder belt anchor 11 are attached to a single flexible line 19, 24, 25 or 26 at design distances apart to position the moveable lap belt anchor 9 further down the rear portion 17 of the door frame 14 than the moveable shoulder belt anchor 11 when the moveable base 12 is in the body-restraint mode.

For dual construction, a moveable lap belt anchor 9 can be attached to one separate flexible line 24, 25 or 26 of FIGS. 5, 7 or 9 and the moveable shoulder belt anchor 11 can be attached to the opposite flexible line 24, 25 or 26 of FIGS. 6, 8 or 10 in juxtaposed side-by-side relationship. Sides can be reversed and any combination of lines 24, 25 or 26 can be used in pairs.

For employment of dual construction, separation of the moveable lap belt anchor 9 and the moveable shoulder belt anchor 11 in body-restraint mode is achieved by rotational control of the motors 30. The motor 30 providing motive power to a flexible line 24, 25 or 26 to which a moveable lap belt anchor 9 is attached can be caused to rotate as required to position the moveable lap belt anchor 9 further down the rear portion 17 of the door frame 14 than the moveable shoulder belt anchor 11 which is attached to a juxtaposed separate flexible line 24, 25 or 26 and powered by a separate motor 30.

In addition to providing separate positioning for body-restraint mode, dual construction provides singular positioning of the moveable lap belt anchor 9 and the moveable shoulder belt anchor 11 at the front portion 15 of the door frame 14 in body-release mode. With the moveable lap belt anchor 9 and the moveable shoulder belt anchor 11 side-by-side or close together at the front of a door, they are more out of the way for getting in and out of the vehicle 6.

Reference is made here to FIGS. 11–13 in addition to FIGS. 1–10. Automation of these motorized bi-level safety belts 1 and 2 can be adjustable and controllable for safety, convenience and preferences of users. A plurality of levels and types of adjustment of automation can be provided separately or in combination. A first adjustment factor can be selection of whether to initiate automatic actuation either by insertion of a key in an ignition keyhole, by turning the ignition key on, by turning the ignition key to a separate rotational setting or by turning a separate switch.

The first adjustment factor can be operated by a switch such as an operational switch having a rotational handle that is preferably a selection knob 31 attached to a selection-switch axle 32 that is in electrical contact circumferentially with control elements in a selection-switch box 33. The selection-switch box 33 can have a first control element positioned circumferentially for selection by rotation of the knob 31 to a position in which a selection arrow 34 points to a first indicator 35 for automatic actuation by insertion of the key in the ignition keyhole. A second control element can be selected by rotation of the knob 31 to a position in which the selection arrow points to a second indicator 36 for automatic actuation by turning the ignition key on. A third control element can be selected by rotation of the knob 31 to a position in which the selection arrow points to a third indicator 37 for automatic actuation by turning the key to a particular circumferential location. A fourth control element can be selected by rotation of the knob 31 to a position in which the selection arrow points to a fourth indicator 38 for automatic operation by turning the knob 31 further against resilient resistance for transit from body-release mode to body-restraint mode or from body-restraint mode to body-release mode from which ever mode in which the moveable base 12 is positioned. Additional control elements can be provided with or without indicators.

An indicator element can be any appropriate type of electrical connector positioned circumferentially in the switch box 33 for contact with a corresponding connector on the switch axle 32. Input current is provided at input line 39 and directed from an output line 40 to an appropriate switch for actuation of the motor 30.

The switching means employed in this invention are not claimed and, therefore, not explained in detail. They are intended to be only diagrammatic of the system, not explanatory of the switching means. Any switching means can be employed. Only enough detail is provided to illustrate a general relationship of elements of this motorized bi-level safety-belt system.

A second adjustment factor can be selection of speed of travel of the moveable lap belt anchor 9, the moveable shoulder belt anchor 11 or the moveable base 12 between body-release and body-restraint modes by rotating a speed-control knob 41 a design distance in a design direction for a desired speed. Similar to the selection knob 31, the speed-control knob 41 can have a speed-switch axle 42, an input line 43, an output line 44 and a speed-switch box 45. Any kind of switching or control means can be employed, however.

A third adjustment factor can be selection of distance apart that the moveable lap belt anchor 9 and the moveable shoulder belt anchor 11 are positioned and how high the moveable shoulder belt anchor 11 is positioned on the rear portion 17 of the door frame 14 in body-restraint mode. Also adjustable can be positioning of the moveable lap belt anchor 9 and the moveable shoulder belt anchor 11 on the front portion 15 of the door frame 14 in body-release mode. This third adjustment factor can be accomplished with a position knob 46 having a position-switch axle 47, a position-switch box 48, an input line 49 and an output line 50. Rotation of the position knob 46 in one direction a design distance can be selection of height of the moveable shoulder belt anchor 11 above the moveable lap belt anchor 9 on the rear portion 17 of the door frame 14 in body-restraint mode. Rotation of the position knob 46 in an opposite direction a design distance can be selection of height of the moveable shoulder belt anchor 11 (and the lap belt anchor 9 if desired) together on the front portion 15 of the door frame 14 in body-release mode.

A combination switch 51 can be provided with common axes of the switch axles 33, 42 and 47. The combination switch 51 or any type or combination of switches can be affixed to a vehicle wall 52 at a desired position separate from or in coaxial combination with an ignition switch. Separate positioning on a dashboard 53 shown in FIG. 13 is preferable.

Motorized bi-level safety belts 1 and 2 can be controlled by a single switch for each door, controlled by a master switch for all doors or controlled by a combination thereof with override by the master switch. A selection of possible but not necessarily recommended positions of combination switch 51 is illustrated in FIG. 13.

Automatic controls of the propulsion means for this invention are intended to include options such as known sensing devices for assuring a door to the vehicle 6 is closed and that a person is sitting on seat 7 before the motor 30 is activated in accordance with rotational positioning of selection knob 31. Known automatic tensioning devices are employed for controlling release of belts 1 and 2 from stationary base 5 when in body-restraint mode to restrain a body of a person on a seat in opposition to impact accidents or sudden stops and yet allow normal movement of the body under normal conditions.

Reference is made here primarily to FIG. 13 in addition to FIGS. 1–10. For conditions in which attitudes of the moveable lap belt anchor 9 and of the moveable shoulder belt anchor 11 are similar, such attitudes of the moveable base 12 are shown to represent the positional attitudes of either the moveable lap belt anchor 9 or the moveable shoulder belt anchor 11 in transit between body-release mode and body-restraint mode. Effects of horizontal attitude, vertical attitude and slant attitudes on positioning the belts 1 and 2 in relation to the steering wheel 21 and the seat 7 are demonstrated. Design rigidity and flexibility of the moveable end 8 of the lap belt 1 and of the moveable end 10 of the shoulder belt 2 are employed as guides extending from the moveable base 12 that is oriented in attitude by guide surfaces 22 of the rectangular rail 13.

These attitudes and positioning of the moveable base 12 and belts 1 and 2 extending from them are general guides rather than precise specifications. Different vehicles 6 have different shapes of door frames 14, different positioning of seats 7, and different positioning of steering wheels 21 that effect desired attitudes. For some vehicles and in some use conditions, the attitude can be vertical constantly with only design rigidity of the moveable end 8 of the lap belt 1 and the moveable end 10 of the shoulder belt 2 as guides in working relationship with the guide surfaces 22 of the rail 13.

For vehicles employing select attitude of the rail 13 and of the moveable anchors 9, 11 or 12 extending therefrom, the following relationships are applicable as desired for different structures of related vehicle features. At a body-release mode, the moveable lap belt anchor 9 and the moveable shoulder belt anchor 11 are preferably side-by-side horizontally as shown or side-by-side vertically proximate opposite top corners of the outside edges of the dashboard 53. En route between a body-release mode and a body-restraint mode, the moveable anchors 9, 11 or 12 can be oriented to a relatively horizontal or completely horizontal attitude as shown in the top corners of FIG. 13.

A long edge of the moveable anchors 9, 10 or 12, represented by numeral 12, and an attached long edge of the moveable end 8 of the lap belt 1 or the moveable end 10 of the shoulder belt 2, also represented by numeral 12, are visible from this rear view when in transit between body-release and body-restraint modes. However, in either mode, only an end view with a short edge is visible. Hence, the longer members 12 at the top outside edges of FIG. 13.

The first objective of orientation of the rail 13 and resulting orientation of the moveable ends 8 and 10 of the lap belt 1 and shoulder belt 2 respectively is to guide the respective belts 1 and 2 away from contact with the steering wheel 21 for positioning them effectively out of the way in body-release mode for getting in and out of vehicles 6. This is the most frequent objection to present passive belt restraints. The second objective is to guide the belts 1 and 2 away from contact with individuals on a seat 7. This is the second most frequent objection to present passive belt restraints. How nearly horizontal or vertical to orient the rail 13 and, therefore, the belts 1 and 2 depends largely on physical structure of particular vehicles. In a relatively vertical attitude of the moveable base 12, the belts 1 and 2 are guided down under the steering wheel 21. In a relatively horizontal attitude of the moveable base 12, the belts 1 and 2 are guided up over a body of an individual on the seat 7. The horizontal attitude, if employed, must be brief, however, or it will cause the belts 1 and 2 to contact rather than to pass over individuals on the seat 7.

At the bottom corners of FIG. 13, moveable lap belt anchors 9 are shown in body-restraint mode with a lap belt 1 extended to the stationary base 5. Immediately below the top corners of FIG. 13, the moveable shoulder belt anchors 11 are shown in body-restraint mode with a shoulder belt 2 extended to the stationary base 5. Dashed lines representing belts extended from the top corners of FIG. 13 can be either lap belts 1 or shoulder belts 2 in transit between modes.

Reference is made here to FIGS. 14–16. An arcuately contoured section 54 can be built into or attached in various ways to either or both the lap belt 1 and the shoulder belt 2. For some vehicles and for some individuals, this can help to guide the respective lap belts and shoulder belts 2 over the individuals without dangerous or startling nearness or injurious contact. With wide, soft edges, the arcuately contoured section 54 also can aid in preventing injury from frontal-impact accidents.

Figure 18:
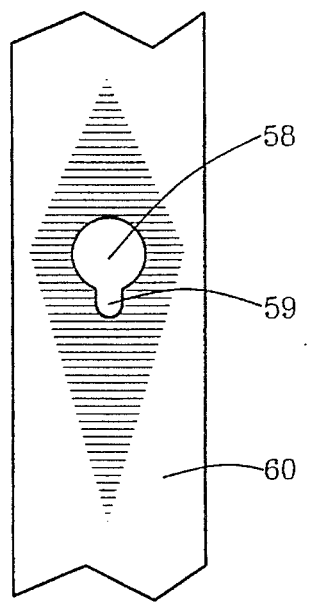
FIG. 18 is a sectional front view of a section of the rail where the stop can be positioned.

Reference is made here to FIGS. 17–18 in addition to FIGS. 1 and 5–6. Alternatively to or in combination with controls described in relation to FIGS. 11–12, a stop 55 can be positioned in a rail 13 for stopping a cog belt 24 for moveable shoulder belt anchor 11 at a position above a moveable lap belt anchor 9 on the rear portion 17 of the door frame 14. The stop 55 can be attached to a stop handle 56 with fastener shaft 57. The rail 13 is provided with a stop orifice 58 having a container slot 59 in an inside wall 60 of the rail 13. A plurality of such orifices 58 can be provided vertically proximate the rear portion 17 of the door frame 14 to which the rail 13 is attached. This provides selective positioning of the moveable shoulder belt anchor 11 in relation to the moveable lap belt anchor 9 in body-restraint mode by positioning the stop 55 in the stop orifice 58 and pressuring it vertically down. A shoulder belt fastener 61 can have a larger periphery than a lap belt fastener 62 in order to allow passage of the lap belt fastener 62 past the stop 55 but not to allow passage of the shoulder belt fastener 61. This stop means is intended primarily for tandem rails 13 with cog belts 24. It may be advisable to place a small wedge 83 under the rail 13 near the bottom end thereof so that the lap belt anchor end is made to turn toward the seat due to a gradual raising and inwardly turning of the rail. Such would position the lap belt toward the vehicle seat more precisely on the driver or passenger.

Figure 19:
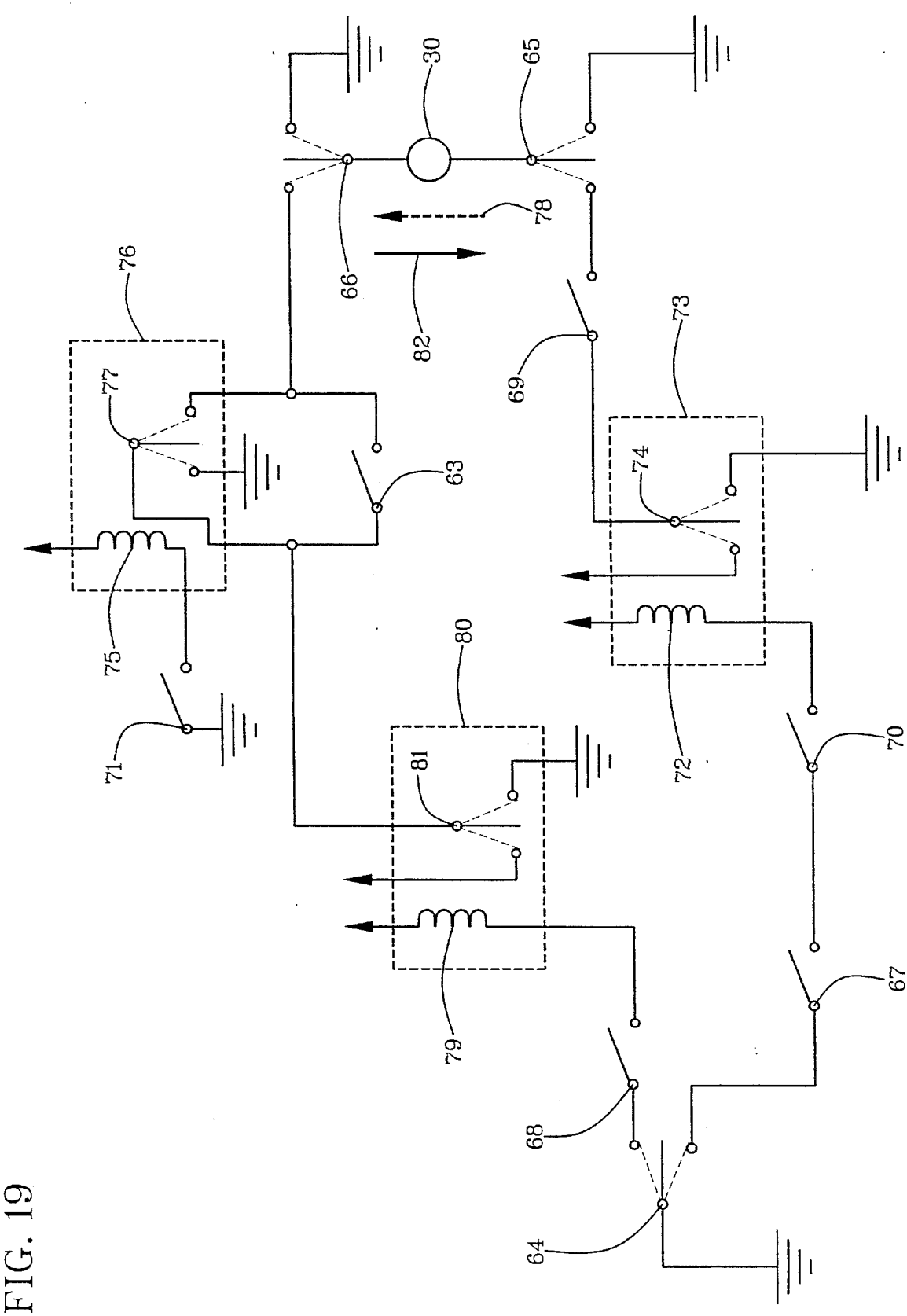
FIG. 19 is an electrical diagram of a manual control for the lap and shoulder belts.

Reference is made here to FIG. 19 primarily in addition to FIGS. 1–13. In conjunction with the manual controls with the selection knob 31 positioned rotationally at the fourth indicator 38 or in conjunction with other manual control switch, the following manual method to control the lap belt 1 can be employed. In order to deactivate the belt 1 from a body-restraint mode, not only must a door to the vehicle 6 be open, but also either the ignition switch must be turned off or a manual switch 63 must be closed. The manual switch 63 prevents disengagement of the lap belt 1 when the door is opened accidently.

Looking now at FIG. 20 in conjunction with FIG. 1, the drive belt 84 is shown in association with the connectors 85 and 86 on the lap belt and shoulder belt respectively. The rail 13 is not shown in FIG. 20, but it will be understood that the connectors 85 and 86 are trammeled by the rail 13; and, a finger 87 in the connector 85 engages a hole 88 in the drive belt 84 while a finger 89 in the connector 86 engages a slot 90 in the drive belt 84.

With the above described arrangement, it will be understood that, when the drive belt 84 is driven in the direction of the arrow 91, both the belt 92 and the belt 93 will be moved around the rail 13 to the rear of the doorway, and to the door post of the automobile 6. The connector 85 of the lap belt will continue along the rail 13 to the end of the rail of the door post, so the lap belt 93 will be in a restraining position across the lap of the driver. When the connector 86 of the belt 92 reaches the shoulder position, the nose 94 of the connector 86 will engage the stopping point 55 so the belt 92 will stop in a restraining position across the shoulder of the driver.

When the driver is ready to exit from the vehicle 6, the sprocket 18 will be driven in reverse, causing the drive belt 84 to move in the opposite direction. The connectors 85 and 86 will, therefore, be moved from the restraining position at the rear of the doorway, shown in broken lines in FIG. 1, to the stowed position forwardly of the doorway as shown in full lines in FIG. 1. The connector 85 will, of course, be moved with the drive belt 84. The connector 86 may be delayed in moving because of the length of the slot 90; but, the connector 86 will eventually be moved along the track. The connector 86 will stop at the end of the rail 13 on the forward portion of the door frame, and the connector 85 will stop beside the connector 86. Thus, in this embodiment of the invention, the two connectors 85 and 86, hence the two belts 93 and 92, will be moved by the drive belt 84; however, the connector 86 can become spaced from the connector 85 because of the slot 90 in the drive belt 84.

Attention is next directed to FIGS. 1 and 21 of the drawings. FIG. 21 shows a modified form of the invention in that the two connectors 85 and 86 are permanently spaced from each other along the drive belt 84.

In FIG. 21, it will be noted that the structure is like FIG. 20, except that the finger 89 extends into a single hole 95 rather than a slot such as the slot 90. With the use of discrete holes 88 and 95, both the connectors 85 and 86, hence both belts 93 and 92, will move as soon as the drive belt 84 moves. Due to the initial spacing of the connectors, the two belts 93 and 92 will move into their proper restraining positions, remaining appropriately separated.

When the belts are to be retracted, the two belts will be moved simultaneously, again maintaining their separation as they retract towards the forward door post of the rail 13.

Assume initially that the vehicle 6 is unoccupied, the doors are closed and the moveable lap belt anchor 9 with the lap belt 1 attached to it are at a front end of their rails 13 in body-release mode. In this condition, switch 64 is in a low position, switch 65 is at the left position and switch 66 is at the right position. Switch 87 is closed because it opens only when the lap belt 1 is at the rear end of its rail 13 in body-restraint mode. Switch 68 is open because it closes only when the lap belt 1 is at the rear end of its rail 13 in body-restraint mode.

Next assume the door is opened and a driver or a passenger enters the vehicle 6. After the door is closed, the switch 64 moves back in the low position, switch 65 is at the left and switch 66 is at the right positions. Meanwhile, switch 67 stays closed. Switch 69 is activated by weight of the driver and/or passenger and closes only if the seat 7 is occupied. Switches 70 and 71 are ignition switches and close when the ignition key is in place and the engine of the vehicle 6 is ignited.

Now, if the seat 7 is occupied and the engine is ignited, then coil 72 in relay 73 will be excited and relay switch 74 is pulled to the left position. Coil 75 in relay 76 also will be excited and pull relay switch 77 to the left. Then current flows in the direction indicated by the dashed arrow 78 through motor 30 to move lap belt 1 to a body-restraint mode for holding an occupant on seat 7 securely. When the lap belt 1 reaches its position at the rear end of its rail 13, switch 68 closes and switch 67 opens. Hence, relay 73 is deactivated and relay switch 74 moves back to the right, which stops the motor 30.

Now assume the door is closed, vehicle 6 is occupied, the belt 1 is in body-restraint mode with switch 68 closed and switch 67 open. The engine is running with switch 70 switch and switch 71 closed. When the door is opened, switch 64 moves up while switch 65 moves to the right and switch 66 moves to the left positions respectively. Coil 79 in relay 80 is excited, which pulls relay switch 81 to its left position. Switch 63 is a manual switch that is accessible by occupants and switch 71 opens only when the ignition is turned off. When either switch 63 is closed manually or when the ignition is turned off, switch 71 is opened, coil 75 in relay 76 is deactivated and relay switch 77 is moved to the right. Current then flows in the direction of the solid arrow 82 through the motor 30 and moves the lap and shoulder belts 1 and 2 toward the front end of the vehicle 6 in body-release mode. Next, switch 67 closes and switch 68 opens. Relay 80 is deactivated and relay switch 81 moves to the right position, which stops the motor 30.

Various modifications may be made of the invention without departing from the scope thereof and it is desired, therefore, that only such limitations shall be placed thereon as are imposed by the prior art and which are set forth in the appended claims.

What is claimed is:

1. In a restraint system for a vehicle, said restraint system including a shoulder belt having a first end fixed to the vehicle generally at the level of the floor, and on one side of a person in the vehicle, and a second end movable from an inoperable position to an operable position, a track fixed to the doorway of the vehicle, said inoperable position being forwardly of said doorway, said operable position being rearwardly of the doorway substantially adjacent to the shoulder of the person in the vehicle and on the other side of said person in the vehicle, the improvement comprising, a lap belt having a first end fixed to the vehicle generally at the level of the floor on said one side of said person, and a second end movable from an inoperable position to an operable position, said inoperable position being forwardly of said doorway, said operable position being rearwardly of the doorway substantially adjacent to the lap of, and on said other side of, said person in the vehicle, said shoulder belt includes a connector movable along said track, a drive belt movable around said doorway and connected to said connector of said shoulder belt for moving said second end of said shoulder belt, a second connector movable along said track, said second connector being engaged with said drive belt for simultaneous movement with said connector of said shoulder belt, said drive belt defining an elongated slot therein, and said connector of said shoulder belt being engaged with said slot so that said connector of said shoulder belt can move along said slot.

2. In a restraint system as claimed in claim 1, said drive belt defining a hole therein, said second connector being engaged with said hole so that said second connector moves with said drive belt.

3. In a restraint system as claimed in claim 1, the further improvement comprising stop means for stopping the movement of said shoulder belt, said stop means being selectively movable along said track.

4. In a restraint system as claimed in claim 1, the improvement wherein said stop means comprises a pin selectively disposable in said track.

5. In a restraint system for a vehicle, said restraint system including a shoulder belt having a first end fixed to the vehicle generally at the level of the floor, and on one side of a person in the vehicle, and a second end movable from an inoperable position to an operable position, a track fixed to the doorway of the vehicle, said inoperable position being forwardly of said doorway, said operable position being rearwardly of the doorway substantially adjacent to the shoulder of the person in the vehicle and on the other side of said person in the vehicle, the improvement comprising, a lap belt having a first end fixed to the vehicle generally at the level of the floor on said one side of said person, and a second end movable from an inoperable position to an operable position, said inoperable position being forwardly of said doorway, said operable position being rearwardly of the doorway substantially adjacent to the lap of, and on said other side of, said person in the vehicle, said shoulder belt includes a connector movable along said track, a drive belt movable around said doorway and connected to said connector of said shoulder belt for moving said second end of said shoulder belt, a second connector movable along said track, said second connector being engaged with said drive belt for simultaneous movement with said connector of said shoulder belt, said drive belt defining a first hole and a second hole spaced apart along said belt, and said connector of said shoulder belt being engaged with said second hole, said connector being engaged with said first hole, the distance between said second hole and said first hole being the same as the distance between said position adjacent to the lap of the person and said position adjacent to the shoulder of the person.

* * * * *